US005935882A

United States Patent [19]

Fujita et al.

[11] Patent Number: 5,935,882

[45] Date of Patent: Aug. 10, 1999

[54] PROTECTIVE GOODS

[75] Inventors: Masakazu Fujita, Tokyo; Yoshio Wakuta, Hyogo; Shiro Kumakawa, Tokyo, all of Japan

[73] Assignee: Teijin Limited, Tokyo, Japan

[21] Appl. No.: 09/077,852

[22] PCT Filed: Oct. 3, 1997

[86] PCT No.: PCT/JP97/03544

§ 371 Date: Jun. 4, 1998

§ 102(e) Date: Jun. 4, 1998

[87] PCT Pub. No.: WO98/15200

PCT Pub. Date: Apr. 16, 1998

[30] Foreign Application Priority Data

| | | | |
|---|---|---|---|
| Oct. 8, 1996 | [JP] | Japan | 8-267218 |
| Mar. 19, 1997 | [JP] | Japan | 9-084626 |

[51] Int. Cl.$^6$ ..... B32B 5/26

[52] U.S. Cl. ..... 442/247; 442/324; 442/326; 2/51; 2/161.6

[58] Field of Search ..... 442/247, 324, 442/326; 2/161.6, 51

[56] References Cited

U.S. PATENT DOCUMENTS

| | | | |
|---|---|---|---|
| 4,604,759 | 8/1986 | Bowman et al. | 2/81 |
| 4,923,741 | 5/1990 | Kosmo et al. | 428/252 |
| 5,136,723 | 8/1992 | Aldridge et al. | 2/81 |
| 5,150,476 | 9/1992 | Statham et al. | 2/93 |
| 5,491,022 | 2/1996 | Smith | 428/224 |

FOREIGN PATENT DOCUMENTS

| | | | |
|---|---|---|---|
| 295 01 651 U | 4/1995 | Germany | A41D 19/00 |
| 2 236 772 | 4/1991 | United Kingdom | D02G 3/04 |

OTHER PUBLICATIONS

International Search Report Jan. 1998.

*Primary Examiner*—Christopher Raimund
*Attorney, Agent, or Firm*—Sughrue, Mion, Zinn, Macpeak & Seas, PLLC

[57] ABSTRACT

The present invention provides protective goods, for example arctic clothing which allows long-time working even under the low temperature environment; said protective goods being characterized by excellent workability, heat-insulation and anti-static feature, without being hardened and embrittled, especially at the temperature of −10 degrees Celsius or below, further, under the environment of very low temperature such levels as −30 degrees Celsius or −60 degrees Celsius, furthermore even under the environment of extremely-low temperature on the level of −100 to −250 degrees Celsius. Protective goods made from a multiple-layer composite cloth, where the composite cloth comprises a surface fabric, an intermediate fibrous-insulator and a lining fabric, mainly composed of aramid fiber, respectively, wherein 1) the surface fabric and the lining fabric, comprises meta-aramid fiber by weight of 50 to 100 percent, para-aramid fiber by weight of 0 to 10 percent and other flame-retardant fiber by weight of 0 to 40 percent, with provision that the total weight-percent of meta-aramid fiber, para-aramid fiber and other flame-retardant fiber, is 100; 2) the intermediate fibrous-insulator comprises a multiple-laminated felt made from aramid fiber; and 3) electro-conductive yarns (a) are arranged along the lengthwise direction of the surface fabric at a density of 1 to 5 per inch and additional electro-conductive yarns and/or tapes (b) are arranged along the direction intersecting the lengthwise direction to form contact points with the electro-conductive yarns (a), whereby triboelectric charge on the outside surface of the protective goods is less than 0.6 micro-coulomb/m2.

12 Claims, 5 Drawing Sheets

PROTECTIVE GOODS

FIELD OF THE INVENTION

The present invention relates to protective goods, more particularly to protective goods with heat-resistant, heat-insulating, anti-static and excellent wear-comfortable features, most suitable for arctic clothing, apron and glove to be used in the cold and extremely-low temperature environment and working.

BACKGROUND OF THE INVENTION

Diversification of the industrial structure has been demanding a rapid increase in the volume of working at severe low temperature and special low temperature environment; such working as electric power development, oil drilling, fire fighting and security-related work in extremely-cold season, working in the freezer and refrigerator throughout the year, as well as forestry, fishery, railway-truck maintenance and cargo-handling at harbor in winter.

Thick clothing made up of air-containing materials, for example, feather and wool is used for clothing to be used when working under the low temperature environment. Recent years have seen a development of the surface and lining clothes comprising synthetic fibers such as polyester and polyamide, combined with (hollow) synthetic fibers insulator, metallic composite sheet and synthetic foam, taking advantage of lightweight and excellent workability.

However, arctic clothing made of conventional synthetic fibers such as polyester and polyamide has no problem when used under the less severe temperature of about 5 to −5 degrees Celsius. However, these materials will be hardened under the working conditions of −10 to −15 degrees Celsius; their heat-insulation (cold-insulation) is insufficient, and long-time working is difficult. Furthermore, the feather and wool withstand the working conditions of a temperature of −20 to −30 degrees Celsius, but turn brittle below −30 degrees Celsius. The most fatal defects are heavy weight, poor workability and weak strength.

On the other hand, aramid fiber is excellent in heat-resistance, flame-retardancy and strength, and has found an extensive application in the clothing to be used by the personnel who may have to be exposed to flame. In this case, combination with other fire-retardant fiber and mixture between meta-aramid fiber and para-aramid fiber are also known.

It has not been known, however, that aramid fiber has excellent heat-insulation (cold-insulation, that is, super heat-insulation in the low temperature environment.) The aramid fiber as heat-insulator (cold-insulator) for arctic clothing has not been used in practice so far.

Furthermore, arctic clothing used under various working environments as mentioned above is required to be high-performance anti-static clothing, preventing static electricity and dust to be accumlated in order to control various problems resulting from static electricity.

SUMMARY OF THE INVENTION

The present invention is intended to solve said problems of arctic clothing and to provide arctic clothing which allows long-time working even under the low temperature environment, said arctic clothing being characterized by excellent workability, heat-insulation (cold-insulation) and anti-static feature, without being hardened and embrittled especially at low temperature of −10 degrees Celsius or below, further, at very low temperature such levels as −30 degrees Celsius or −60 degrees Celsius, furthermore even at extremely-low temperature on the level of −100 to −250 degrees Celsius.

In an effort to solve these problems, the present inventors have found out that the above problems can be solved by a combination of fibers containing aramid fiber excellent in heat-insulation (cold-insulation) and conductive yarns and/or conductive tapes. This finding has lead to the present invention.

The present invention thus provides the following embodiments of protective goods.

(1) Protective goods made from a multiple-layer composite cloth, characterized in that said composite cloth comprises a surface fabric, an intermediate fibrous-insulator and a lining fabric, mainly composed of aramid fiber, respectively, wherein
① said surface fabric and said lining fabric, comprises meta-aramid fiber by weight of 50 to 100 percent, para-aramid fiber by weight of 0 to 10 percent and other flame-retardant fiber by weight of 0 to 40 percent, with provision that total weight-percent of meta-aramid fiber, para-aramid fiber and other flame-retardant fiber, is 100;
② said intermediate fibrous-insulator comprises a multiple-laminated felt made from aramid fiber; and
③ electro-conductive yarns (a) are arranged along lengthwise direction of said surface fabric at a density of 1 to 5 per inch and additonal electro-conductive yarns and/or tapes (b) are arranged along the direction intersecting said lengthwise direction to form contact points with said electro-conductive yarns (a), whereby triboelectric charge on the outside surface of said protective goods is leas than 0.6 micro-coulomb/m2.

(2) Protective goods according to (1), wherein said surface fabric further comprises a water-repellent layer on the outside surface thereof.

(3) Protective goods according to (1), wherein said surface fabric further comprises an inorganic heat-resistant and cold-proof layer of the thickness of 0.1 to 1.0 mm inside and/or on the outside surface thereof.

(4) Protective goods according to any one of (1) to (3), wherein both of said surface fabric and said lining fabric, are woven fabric, having warp density more than 50 threads per inch and weft density more than 50 threads per inch.

(5) Protective goods according to any one of (1) to (4), wherein the volume-resistivity of said conductive yarns. ((a) or (b)) is in the range of $10^{8}$14 $10^{-5}$ Ω·cm.

(6) Protective goods according to any one of (1) to (5), wherein said other flame-retardant fiber is at least such one selected from the group consisting of polybenzimidazole fiber, poly-p-phenylenebenzbisoxazole fiber, phenolic fiber, melamine fiber and polyimide fiber.

(7) Protective goods according to any one of (1) to (6), wherein said goods is in the form of an arctic outer-clothing.

(8) Protective goods according to any one of (1) to (6), wherein said goods is in the form of an arctic inner-clothing.

(9) Protective goods according to (7), wherein said outer-clothing is integrated with said inner-clothing.

(10) Protective goods according to (9), wherein the lining fabric of said outer-clothing and/or the surface fabric of said inner-clothing further comprises a moisture-permeable layer on the surface thereof.

(11) Protective goods according to any one of (1) to (6), wherein said goods is in the form of a working apron.

(12) Protective goods according to any one of (1) to (6), wherein said goods is in the form of a working glove.

BRIEF DESCRIPTION OF THE INVENTION

Figure 1:
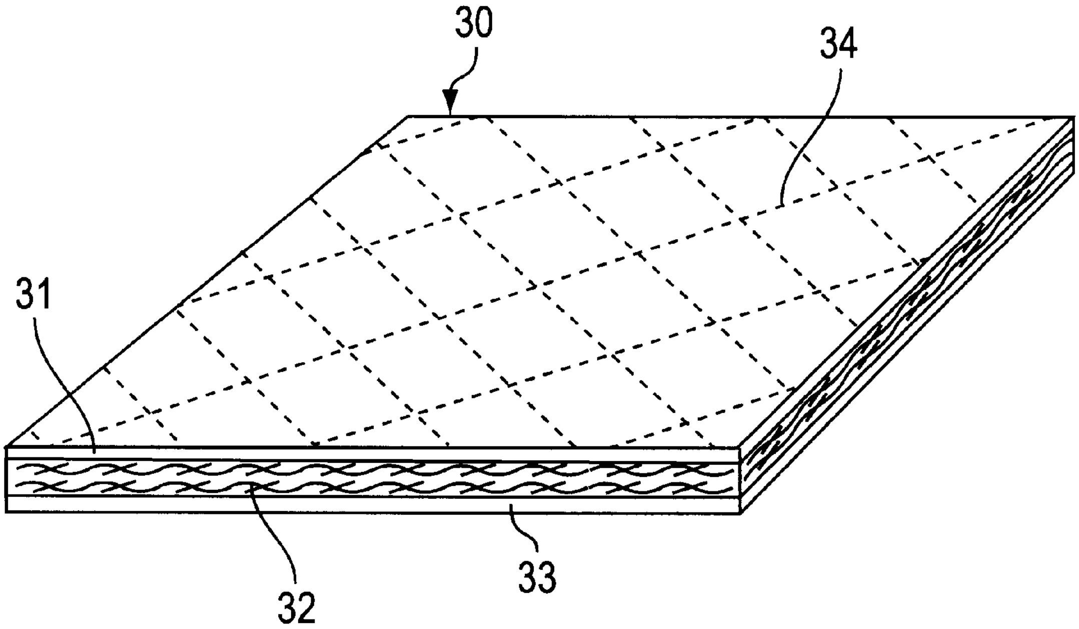
FIG. 1 is a schmatic drawing representing a multiple-layer composite cloth according to the present invention.

In these figures, the reference numbers have the following meaning.

1. An arctic clothing
10. An arctic outer-clothing
11. An upper-clothing in an arctic outer-clothing
12. An under-clothing in an arctic outer-clothing
20. An arctic inner-clothing
21. An upper-clothing in an arctic inner-clothing
22. An under-clothing in an arctic inner-clothing
30. A multiple-layer composite cloth
31. A surface fabric
32. An intermediate fibrous-insulator
33. A lining fabric
34. Stitching bonding

DETAILED DESCRIPTION OF THE INVENTION

Protective goods according to the present invention are made from a multiple-layer composite cloth which comprises a surface fabric, an intermediate fibrous-insultor and a lining fabric, shown in FIG. 1. Said surface fabric and said lining fabric comprises meta-aramid fiber by weight of 50≠100 percent, para-aramid fiber by weight of 0≠10 percent and other flame-retardent fiber by weight of 0≠40 percent with provision that total weight-percent of meta-aramid fiber, para-aramid fiber and other flame-retardent fiber is 100. When the fabric without containing at least 50% of meta-aramid fiber, is used under the low temperature working environment exceeding −10 degrees Celsius, the cold-insulation will deteriorate, and the workability will be impoverished by hardening and embrittlement, so it will be unable to permit long-time working under the low temperature working environment exceeding −10 degrees Celsius.

In this case, a combination of meta-aramid fiber and above-quantitative para-amide fiber and other flame-retardant fiber increases not only cold-insulation but also heat-resistance and flame-resistance.

Moreover, both of said surface and lining fabric are preferred to be woven fabric, having warp density more than 50 threads per inch, more preferably 50 to 150 threads per inch and weft density more than 50 threads per inch, more preferably 50 to 100 threads per inch. If the densities are lower, heat-insulation will be insufficient under the low temperature environment without allowing long-term working under such environment. If the densities are higher, on the other hand, weaving properties will deteriorate, resulting in poorer quality of the obtained woven fabric.

Filament yarn with a total fiber size of 30 to 300 deniers or spun yarn of 80 to 20 counts, for example, are used for weaving of said high density fabric. These filament yarn and spun yarn may be composed of only meta-aramid fiber. Also, commingled yarn and mixed spun yarn comprising 50% or more of meta-aramid fiber and other fibers may be used.

As discussed above, an excellent heat-insulation effect is obtained unexpectedly under the low temperature environment when the high density woven fabric comprising 50% or more of meta-aramid fiber, is used, or the high density fabric containing 10% or less of para-aramid fiber and 40% or less of other flame-retardant yarn is used along with the meta-aramid fiber.

The meta-aramid fiber can be exemplified by polymetaphenylene isophthalamide and its copolymer copolymerized with a third component. An example of the polymetaphenylene isophthalamide copolymer is the copolymer represented by the following formula:

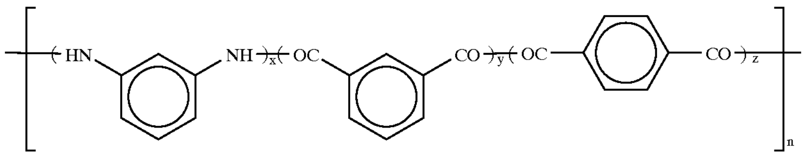

(where x=y+z,y>z, n represents the number of repeating units)

Furthermore, para-aramid fiber includes polyparaphenylene phthalamide and its copolymer copolymerized with a third component. An example of the polyparaphyenylene phthalamide copolymer is represented by the following formula.

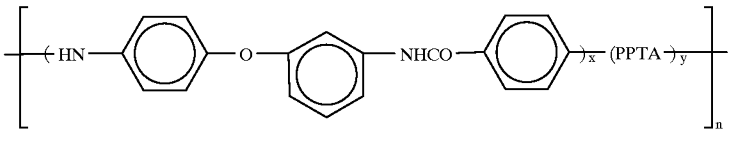

(where x=y, n represents the number of repeating units)

Other flame-retardant fiber includes flame-retardant rayon, fire-proofed cotton, fire-proofed wool, flame-retardant polyester fiber, flame-retardant acryl fiber, poly-benzimidazole fiber, poly-p-phenylenebenzbisoxazole fiber, phenolic fiber, melamine fiber and polyimide fiber.

Said intermediate fibrous-insulator in protective goods according to the present invention comprises a multiple-laminated felt made from aramid fiber. It is very important to use the felt made from aramid fiber as a fibrous-insulator laid between the surface and living fabric, above-mentioned, of protective goods according to the present invention.

As a result of using the felt made from aramid fiber as above-mentioned cold-insulation is elevated under the low temperature environment on the level of −60 degrees Celsius. Aramid fiber used for said surface fabric can be utilized to form this felt. Either meta-aramid fiber or para-aramid fiber can be used, but use of meta-aramid fiber is more preferred. Above all, the insulator is preferred to be made of a multiple-laminate comprising aramid felt having a density of 50 to 200 g/m2 and thickness of 0.5 to 3.5 mm. If felt density is too small, a sufficient heat-insulation effect cannot be ensured; whereas if it is too large, ventilation and moisture-permeability will be poor, and working movements will be subjected to restrictions; this indicates poor workability.

The insulator is preferred to be fixed on said surface and/or lining fabric in order to prevent deviation which may occur when washing is repeated. This fixing method can be exemplified by bonding method of using adhesives and quilting method by stitching. To improve durability against washing, use of quilting method is preferred. In this case, the preferred quilting interval is within the range from about 35 to 50 mm.

In protective goods according to the present invention electro-conductive yarns (a) are arranged along lengthwise direction of said surface fabric at a density of 1 to 5 per inch and additional electro-conductive yarns and/or tapes (b) are arranged along the direction intersecting said lengthwise direction to form contact points with said electro-conductive yarns (a), whereby triboelectric charge on the outside surface of said protective goods is less than 0.6 micro-coulomb/m2.

Electro-conductive yarns (a) and electro-conductive tapes (b) used for protective goods according to the present invention are preferred to have conductive substances deposited on the fibers and the tapes comprising polyester, polyamide or aramid. These yarns and tapes with the volume-resistivity of $10^{8}$ to $10^{-5}$ ohm-cm are used preferably.

The material and conductive substance constituting electro-conductive yarns (a) and electro-conductive tapes (b) need not be identically the same with one another; they may be different each other so long as the volume-resistivity is within the range mentioned above. Desposition of conductive substances may be made by any of the following method; coating, dipping, adhesion, vapor-deposition and plating. The method of no-electrolysis plating of nickel on polyester or aramid material, or coating of copper on polyamide or acryl material is preferred in particular.

In protective goods according to the present invention said conductive yarns (a) are arranged along lengthwise direction of said surface fabric and said additional conductive yarns and/or tapes (b) are arranged along the direction intersecting said lengthwise direction to form contact points with said conductive yarans (a). As a result of forming said contact points with conductive yarns and/or tapes as above-mentioned, triboelectric charge on the outside surfce of said protective goods according to the present invention is such levels as less than 0.6 micro-coulomb/m2. If the triboelectric charge exceeds 0.6 micro-coulomb/m2, the effect of anti-static and dust preventive measures will be insufficient under various working conditions, and safety and cleanliness are insufficient. It should be noted that triboelectric charge has been measured according to JIS T-8118, 1994.

In protective goods according to the present invention said conductive yarns (a) are arranged along lengthwise direction of said surface fabric at a density of 1 to 5 per-inch. If the per-inch number of said yarns (a) is less than one, there is no anti-static performance, and even if the per-inch number is over five, the effect does not increase and is saturated at a constant level. Further said conductive yarns (a) arranged along the lengthwise direction of said surface fabric are preferred to be, incorporated to warp consisting the woven fabric mentioned above, and to be intersected with said another conductive yarns and/or tapes (b) inside or on the surface of said fabric.

When said conductive yarns (a) are incorporated into the warp, they are preferred to be commingled into the aramid fiber as the major component or doubling and twisting with it. They may be arranged parallel to aramid fiber.

In protective goods according to the present invention, conductive yarns and/or tapes (b) intersecting conductive yarns (a) along lengthwise direction of said surface fabric can be embodied as follows: One to five conductive yarns (b) may be incorporated into the weft of the woven fabric to intersect the warp, or they may be incorporated as the sewing thread at the angle different from the warp direction of the woven fabric to intersect the warp. Or they may be laminated onto the woven fabric surface at the angle different from the warp direction of the woven fabric to intersect the warp. Conductive tapes (b) are laminated onto the woven fabric surface at the angle different from the warp direction of the woven fabric, thereby intersecting the warp. In this case, they may be laminated on the woven fabric through adhesive or sewing thread.

To put it concretely, members constituting protective goods, for example an arctic clothing are made from said high density woven fabric, wherein said conductive yarns (a) are incorporated into the warp, and said conductive yarns (b) may be used as sewing thread or stitching thread when sewing them. Or said conductive tapes (b) may be used as the joint protion when each member is jointed, and may be jointed to the end portions of the arctic clothing such as the collar, sleeve and train. In this case, said conductive tapes (b) are preferred to be laid on innerside surface of the surface and/or lining fabric to maintain good appearance of the arctic clothing.

Furthermore, in protective goods according to the present invention said surface fabric is preferred to comprise a water-repellent layer on the outside surface thereof, to improve wear-comfort as protective goods. The treatment to ensure a water-repellent layer is intended to prevent water from freezing and to avoid contamination by dirt. This treatment is not restricted in any particular way; any of the heretofore known methods can be used. It is preferred to have 3 wt % or more of fluorine resin or silicone resin, or more preferably 5 wt % or more to be deposited on the outside surface of said surface fabric.

Furthermore in protective goods according to the present invention, said surface fabric is preferred to comprise an inorganic or organic heat-resistant and cold-proof layer of the thickness of 0.1 to 1.0 mm inside and/or on the outside surface thereof The treatment to ensure an inorganic or organic heat-resistant and cold-proof layer is intended not only to prevent liquid gas (for example, liquid natural gas or liquid propane gas) from penetrating into inside portion even if sticked on said surface fabric but also to prevent flame from proceeding into inside portion even if exposed to flame. If the thickness of said layer is less than 0.1 mm, there is no performance for prevention of liquid-gas penetration and flame-procession and if the thickness is over 1.0 mm, the said fabric is less flexible, so indicates poor workability and wear-comfort. This treatment is embodied as following methods; Substance having heat-resistant and cold-proof features is selected from inorganic silicone resin or organic acrylnitrile resin and is preferred to be mixed with short-cut meta-aramid fiber. The substance is in the form of sheet which is bonded on said surface fabric (so called "topping"). Otherwise the substance is in the form of liquid, which is coated on said surface fabric (so called "coating"). Coating method using inorganic silicone resin is more preferred. To comprise said layer inside the surface fabric, the fabric comprising said layer on the outside surface thereof is doubled in such a manner that said layer is to be inside.

Protective goods according to the present invention may be in the form of an arctic clothing, a working apron, a working glove, a working arm cover, a working shoes, a shoes cover and a matting sheet.

In the form of an arctic clothing, it may consist of not only the upper-clothing but also the upper-and lower-clothing, separated from each other. In latter case it may be the overalls where upper-and lower-clothing are combined into one-piece. Moreover an arctic clothing may be a combination of the outer-clothing and the inner-clothing, both of which consist of the upper-clothing and the lower-clothing, either separated or into one-piece, and are integrated at several portions through buttons, hooks or zip fasteners. This construction of said arctic clothing with outer-clothing and inner-clothing gives a surprising high-level heat-resistance and heat-insulation because of two multiple-layer composite cloths and air barrier between said cloths, so said arctic clothing is used for a worker to perform check and maintenance of lines producing combustible liquid gas (for example, liquid natural gas or liquid propane gas) with extremely-low temperature level of −100 to −250° C.

Figure 2A:
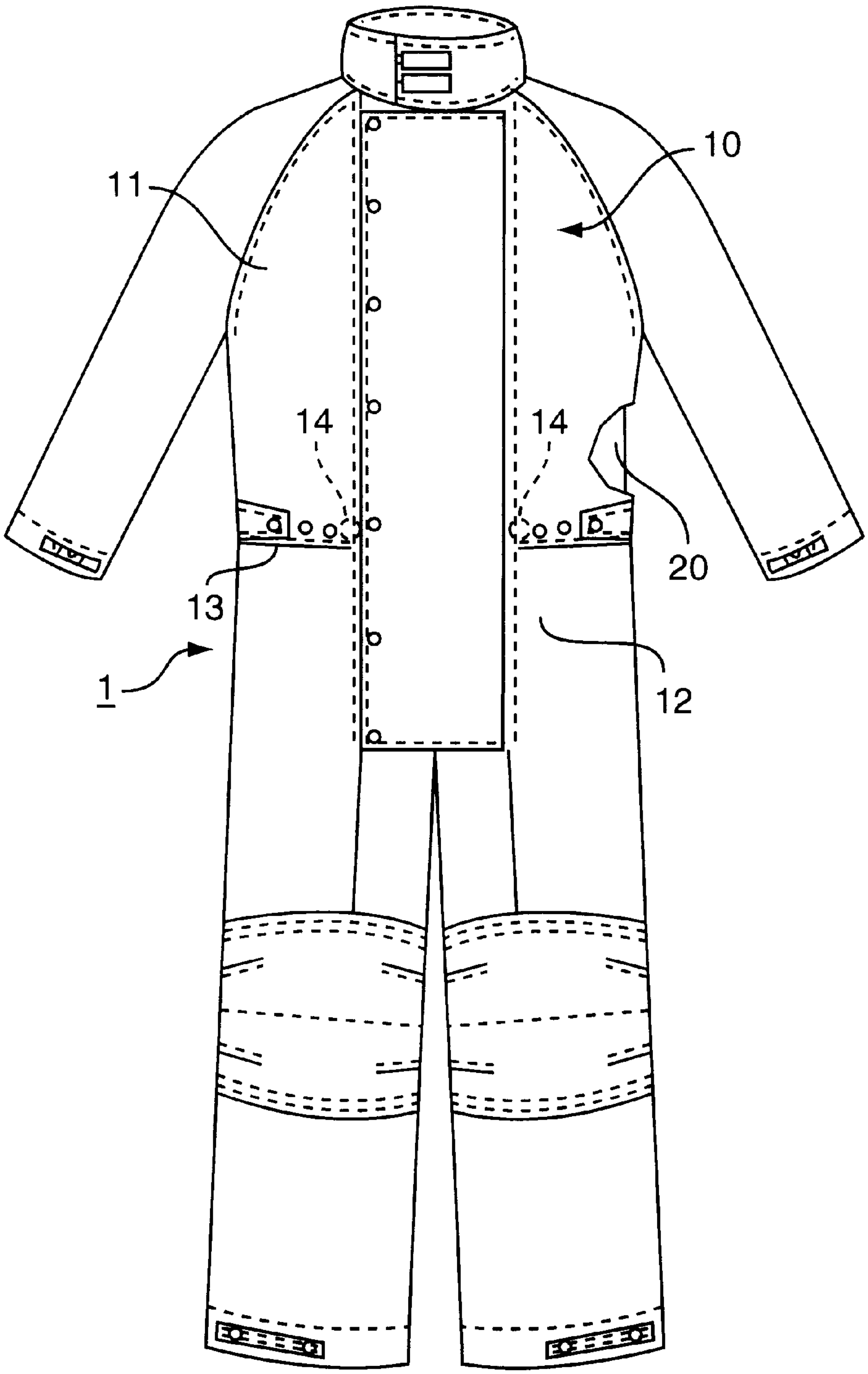
FIG. 2(A) is a front view of a schmatic drawing representing an embodiment of protective goods in the form of an arctic outer-clothing according to the present invention.
Figure 2B:
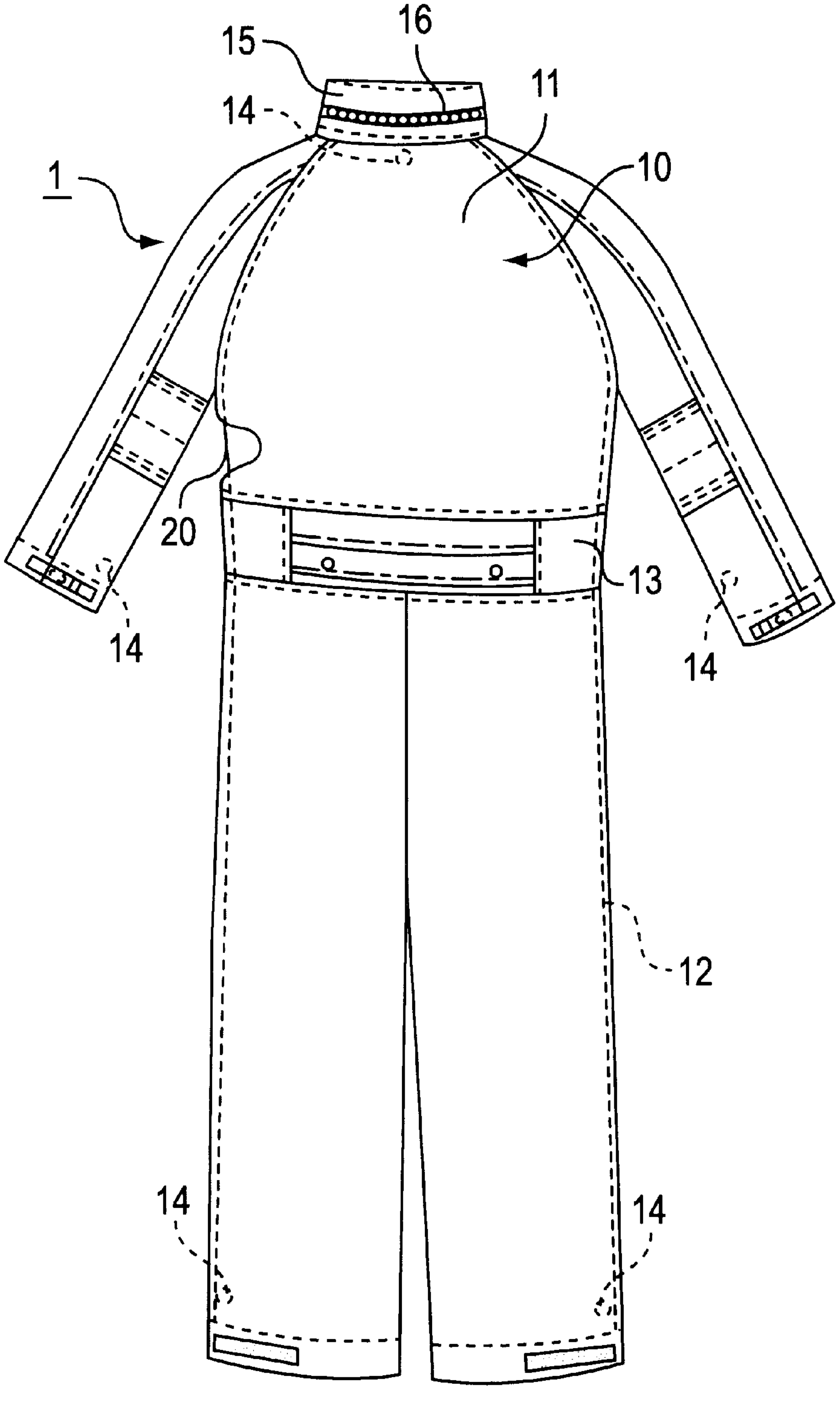
FIG. 2(B) is a back view of a schmatic drawing representing an embodiment of protective goods in the form of an arctic outer-clothing according to the present invention.
Figure 3A:
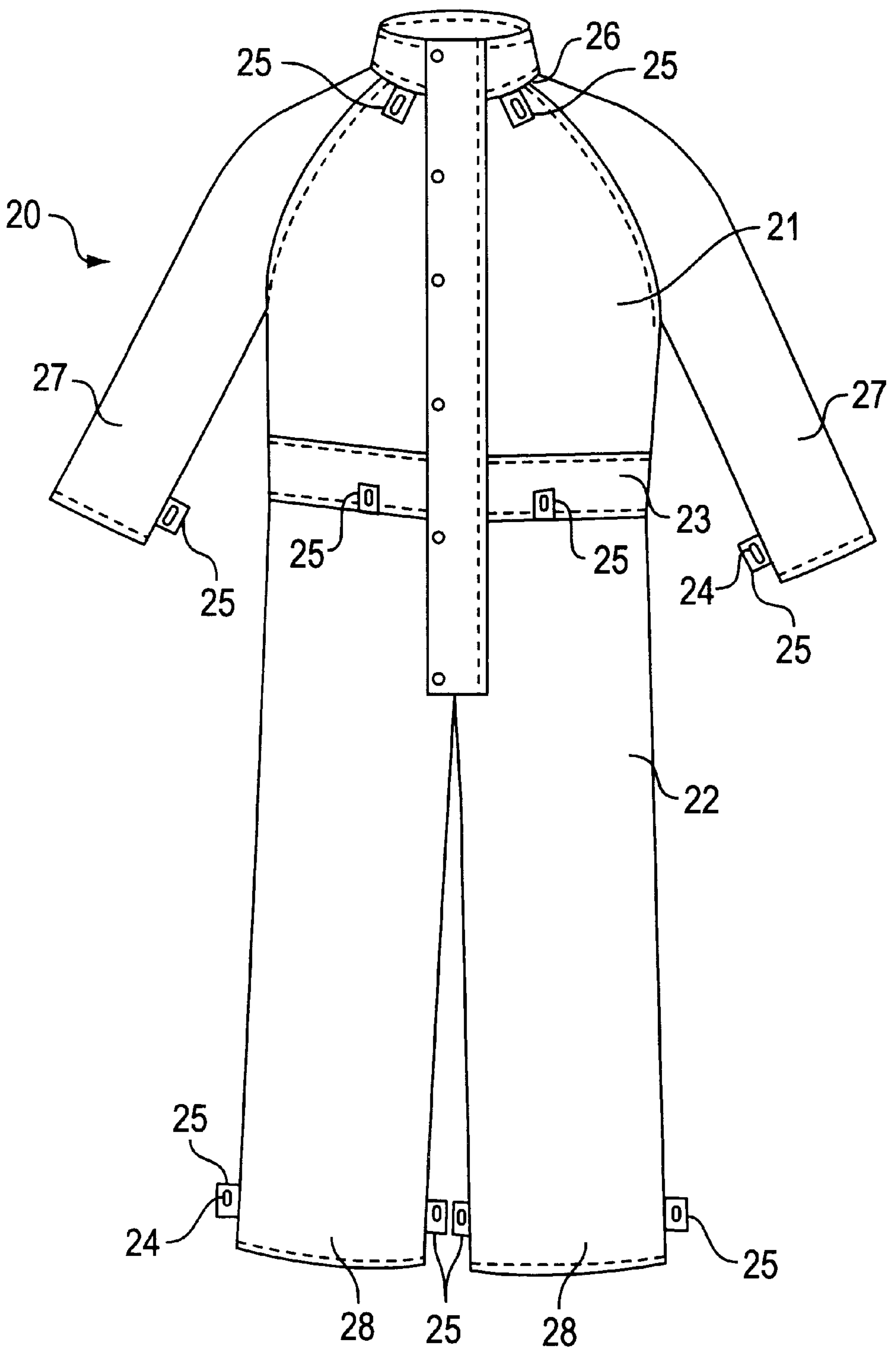
FIG. 3(A) is a front view of a schmatic drawing representing an embodiment of protective goods in the form of an arctic inner-clothing according to the present invention.
Figure 3B:
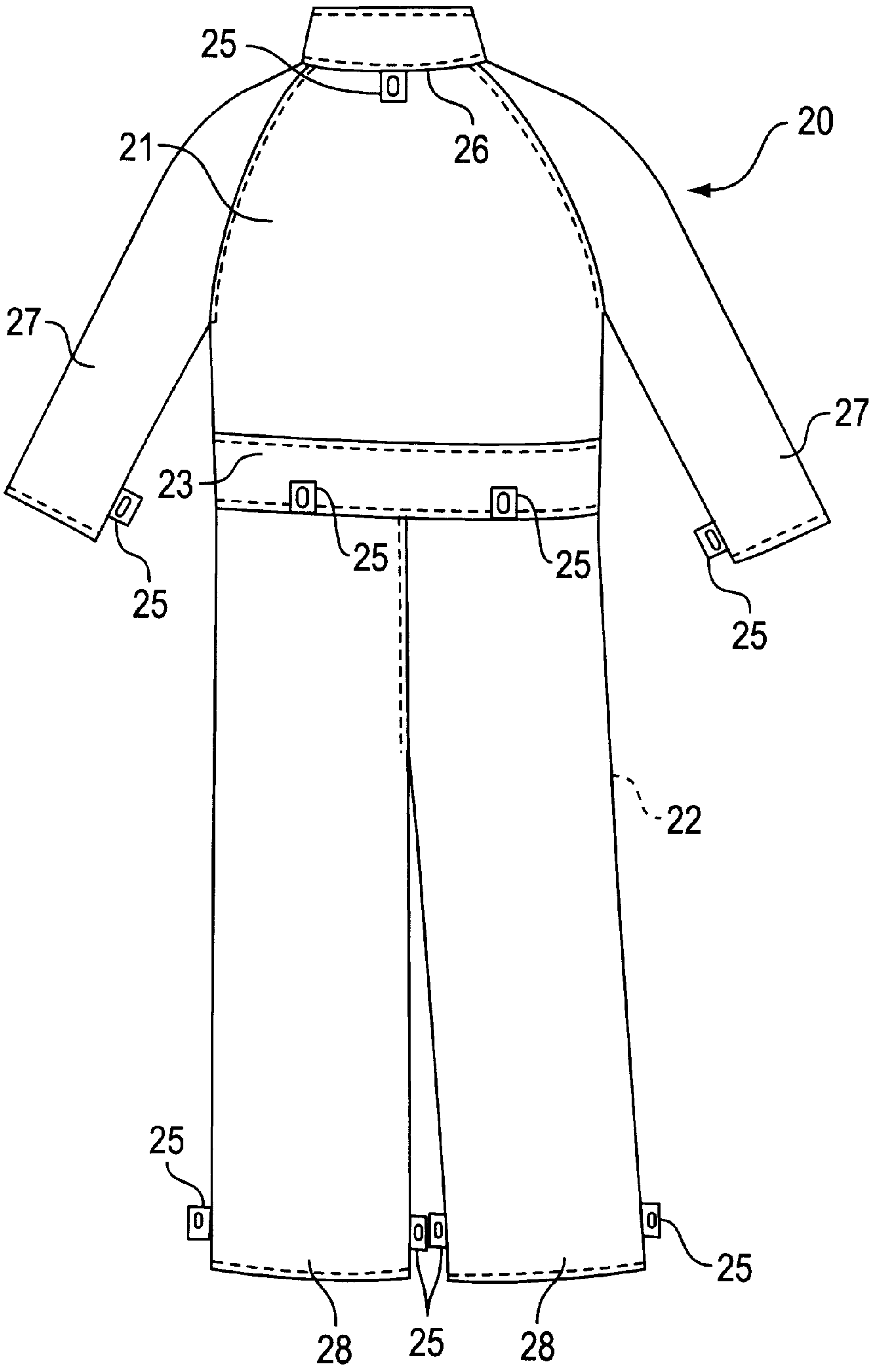
FIG. 3(B) is a back view of a schmatic drawing representing an embodiment of protective goods in the form of an arctic inner-clothing according to the present invention.

The above-mentioned construction can be exemplified by FIG. 2(A) and FIG. 2(B), illustrating the arctic outer-clothing 10, and FIG. 3 (A) and FIG. 3(B), illustrating the arctic inner-clothing 20, wherein (A) represents a front view and (B) represents a back view. As shown in FIG. 2(A) and FIG. 2(B), said outer-clothing 10 consists of the upper-clothing 11 (hereafter abridged as jacket) and lower-clothing 12 (hereafter abridged as pants), both combined at body portion 13. FIG. 3(A) and FIG. 3(B), illustrating said inner-clothing 20, show, in a same way as said outer-clothing 10, jacket 21 and pants 22 to be combined at body portion 23. Inner-clothing 20 is integrated inside outer-clothing 10 through button-suspending method. As shown in FIG. 3(A) and FIG. 3(B), on several portions of said clothing 20 are attached connection pieces 25 made from cloth with button-suspending aperture 24; Namely, said pieces 25 are attached at a constant length surrouding body portion 23 and collar portion 26. In addition, said piece 25 is attached, on every right and left sleeve 27 of jacket 21 and on both sides of every right and left train 28 of pants 22. Said outer-clothing 10 has buttons 14 at portions corresponding to connection pieces 25 attached to said inner-clothing 20 and said clothing 20 can be integrated inside said clothing 10, wherein said buttons 14 are suspended through apertures 24 of said pieces 25 on said clothing 20. Said inner-clothing 20 may be integrated inside said outer-clothing 10 by fasteners or stitch-bonding in befalf of button-suspending.

Above-mentioned embodiment is exemplified by overalls arctic clothing, consisting of the upper clothing 11 or 21 (jacket) and lower clothing 12 or 22 (pants), both combined at body portion 13 or 23. Moreover, another embodiment is exmplified in such a manner that jacket and pants are separated from each other. In this embodiment, mutual integration between jacket of outer-clothing and inner-clothing and pants thereof, may be performed in the same way as overalls arctic clothing. This separated arctic clothing has more overlapped portion between upper-clothing and lower-clothing than overalls arctic clothing, whereby this clothing is superior in heat-resistant and heat-insulating features, so it is used preferably to a worker because of not only good protectivily but also easy wearing.

Protective goods according to the present invention, which is a combination of the outer-clothing and the inner-clothing as mentioned above in detail, may be preferred to be characterized in that the lining fabric of said outer-clothing and/or the surface fabric of said inner-clothing further comprises a moisture-permeable layer on the surface thereof. The treatment to ensure a moisture-permeable layer is embodied as following methods: Substance having moisture-permeable feature is selected, for example, from urethane resin. The substance is in the form of sheet which is bonded on said surface, or in the form of liquid which is coated on said surface. Comprising said layer on the surface of either lining fabric of outer-clothing or surface fabric of inner-clothing is resulted in the same moisture-permeable effect and it is preferred that said layer is comprised on both surfaces of lining fabric of outer-clothing and surface fabric of inner-clothing, whereby moisture-permeable feature is remarkably improved.

Furthermore to improve heat-insulation effect, it is preferred to attach collars made of Boa cloth to the arctic clothing according to the present invention. For arctic clothing used under the low temperature environment on the level of −30 degrees Celsius, this collar may be made of Boa cloth including acryl fibers used for normal arctic clothing. For arctic clothing employed under the extremely-low temperature environment on the level exceeding −60 degrees Celsius, however, use of the high pile Boa cloth made from aramid fiber is preferred.

Protective goods according to the present invention may be applied not only in the form of an arctic clothing, but also in the form of a working apron, a working glove, a working arm cover, a working shoes, a shoes cover and a matting sheet, as above-mentioned. Combined wearing of said arctic clothing and said other goods, especially a working apron covering the front of said clothing or a working glove covering the ellow and hand, is most preferred to improve heat-resistant and heat-insulating features, keeping wearing comfort.

The present invention provides protective goods, for example arctic clothing which permits a long-time working under the low temperature environment and which ensures excellent workability, heat-insulation and anti-static features, without being hardened or embrittled under the low temperature environment especially at −10 degrees Celsius or less, further, under the environment of very low temperature on the level of −30 or −60 degrees Celsius, furthermore, even under the environment of extremely-low temperature on the level of −100 to −250 degrees Celsius.

The following describes the present invention in greater detail with reference to specific.

Workability, heat-insulation and triboelectric charge in the examples were measured as follows;

(1) Workability

Organoleptic test was conducted to evaluate the ease of working when the clothing was used under the atmosphere of −30 or −60 degrees Celsius. Extremely good results were marked with "◎", and good results were given "o", whereas "x" was assigned to the cases where the surface fabric was hardened and embrittled with restrictions given to body movements.

(2) Heat-insulation

A thermal mannequin was used under the atmosphere of −30 or −60 degrees Celsius to measure the do-values of the breast and fore-arm portion of the upper clothing. Based on this measurement, extremely good results were marked with "◎", and good results were given "o", whereas "X" was assigned to the unacceptable results.

(3) Workable time

The inventors measured the time during which continuous working was possible under the atmosphere of −30 or −60 degrees Celsius.

(4) Triboelectric charge

Triboelectric charge was measured according to JIS T-8118, 1994.

EXAMPLES 1 to 5, and COMPARATIVE EXAMPLES 1 to 6

The following high density woven fabric (A) and felt (B) were utilized as a surface and lining fabric and as an intermediate fibrous-insulator, respectively.

(A) High density woven fabric

This is woven fabric manufactured to have warp density of 112 threads per inch and weft density of 57 threads per inch, using the spun yarn (two folded yarn of 40 count of yarn) shown in Table 1, and the doubled and twisted yarn between said spun yarn and polyamide-based conductive yarn (a) "Metalian" (registered trade name, made by Teijin Limited, with the volume-resistivity of $10^{-3}$ ohm.cm), In Table 1, m-aramid, p-aramid, polyester and flame-retardant rayon show the following fibers:

(a) m-aramid

Polymetaphenylene isophthalamide copolymer fiber "Teijinconex" (registered trade name, made by Teijin Limited) shown in the following formula:

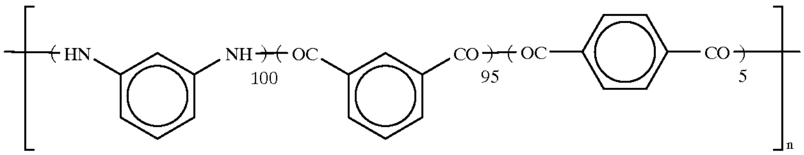

(b) p-aramid

Polyparaphenylene phthalamide copolymer fiber "Technora" (registered trade name, made by Teijin Limited) shown in the following formula:

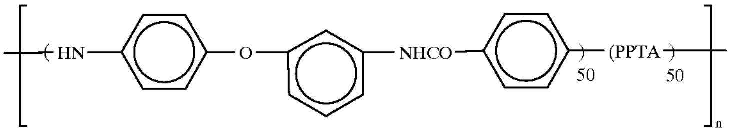

(c) Polyester

Polyethylene terephthalate fiber "Tetron" (registered trade name, made by Teijin Limited)

(d) Flame-retardant rayon

Flame-retardant rayon "Tasban" (registered trade name, made by Toyobo Limited)

(B) Felt

Two laminate of felt made from the m-aramid fiber used for high density woven fabric (density: 100 g/m2, thickness: 2.0 mm)

Moreover, the following conductive material (C) was utilized as additional conductive yarns and tapes (b).

(C) Conductive material

Conductive sewing thread (b)

Meta-aramid spun yarn used for high density woven fabric, being plated by nickle through no-electrolysis method, said yarn having the volume-resistivity of $10^{-2}$ ohm.cm.

Conductive tape (b)

Polyester spun fabric, being plated by nickel through no-electrolysis method "Herz" (registered trade name, made by Teijin Limited), said fabric having the volume-resistivity of $10^{-2}$ ohm.cm.

The above-mentioned high density woven fabric was used to form the surface and lining fabric, and the above-mentioned felt, as an intermediate fibrous-insulator was laid between the surface and lining fabric. The insulator was stitched to lining fabric by quilting, and this three-layer composite cloth was used to create the arctic clothing of specified dimensions by sewing. The quilting seam interval in this case was 40 mm, and 2 cm-wide conductive tapes (b) mentioned above were stitched to the edges of both sleeves of the upper-clothing of the arctic clothing and to the edges of both trains of the lower-clothing, using the conductive sewing tread (b), mentioned above.

Table 1 shows the result of evaluating these arctic clothing under the low temperature environment of −30° C. When the high density woven fabric containing 50% or more of meta-aramid fiber was used with conductive yarn (a) employed as warp therein, and conductive tape (b) and sewing thread (b) jointed to the edges of the clothing were made to intersect conductive yarn (a) of said warp (examples 1 to 5), excellent workability and heat-insulation were obtained even under the low temperature environment of −30 degrees Celsius, and long time continuous working was possible. Anti-static feature was also excellent. By contrast, anti-static feature was poor when the density of conductive yarn (a) of the warp was less than 1 thread per inch (Comparative example 1), and there was no conductive material (b) intersecting conductive yarn (a) of the warp (Comparative example 2). When 100% polyester fiber (Comparative example 6) or polyester fiber containing below 50% of meta-aramid fiber (Comparative example 4) was used in warp, the surface fabric was hardened resulting in poor workability and heat-insulation. Continuous working was possible for only about 40 minutes. When wool was used (Comparative example 5), workability was poor because of heavy weight, and strength was unsatisfactory.

TABLE 1

| | Warp | | | | | | | | |
|---|---|---|---|---|---|---|---|---|---|
| | Spun Yarn | | | | | | | | |
| | Type of Fibers | Percentage of Mixed Spun Yarn (%) | Conductive Yarn (a) thread per inch | Additional Conductive Yarn or/and Tape | Work-ability | Heat-insulation (clo-value) Breast Portion | Fore-arm Portion | Workable Time at −30° C. min | Triboelectric Charge micro-coulomb/$m^2$ |
| Example 1 | m-aramid | 100 | 1 | Provided | ◎ | ◎ | ◎ | 180 or more | 0.4 |
| Example 2 | m-aramid<br>p-aramid | 95<br>5 | 1 | Provided | ◎ | ◎ | ◎ | 180 | 0.4 |
| Example 3 | m-aramid<br>p-aramid<br>rayon (flame-retardant) | 60<br>5<br>35 | 1 | Provided | ◎ | ◎ | ◎ | 180 | 0.4 |
| Comparative Example 1 | m-aramid<br>p-aramid<br>rayon (flame-retardant) | 60<br>5<br>35 | 0.5* | Provided | ◎ | ◎ | ◎ | 180 | 0.65 |
| Example 4 | m-aramid<br>p-aramid<br>rayon (flame-retardant) | 60<br>5<br>35 | 5 | Provided | ◎ | ◎ | ◎ | 180 | 0.2 |
| Comparative Example 2 | m-aramid<br>p-aramid<br>rayon (flame-retardant) | 60<br>5<br>35 | 5 | not provided* | ◎ | ◎ | ◎ | 180 | 0.8 |
| Comparative Example 3 | m-aramid<br>p-aramid<br>rayon (flame-retardant) | 60<br>5<br>35 | 6* | provided | ◎ | ◎ | ◎ | 180 | 0.2 |
| Example 5 | m-aramid<br>polyester | 55<br>45 | 1 | provided | ○ | ○ | ○ | 120 or more | 0.4 |
| Comparative Example 4 | m-aramid<br>polyester | 45*<br>55 | 1 | provided | X | X | X | 45 | 0.4 |
| Comparative Example 5 | wool | 100* | 1 | provided | X | X | X | 30 | 0.4 |
| Comparative Example 6 | polyester | 100* | 1 | provided | X | X | X | 30 | 0.4 |

Asterisked characteristics are outside the range of characteristics according to the present invention

EXAMPLES 6 to 9

In Example 3, density of the woven fabric has been changed as shown in Table 2. The result is given in Table 2. When warp density was 50–150 threads per inch and weft density was 50–100 threads per inch (Examples 6 to 9), excellent heat insulation, long continuous working time and excellent anti-static feature were obtained.

TABLE 2

| | Density of Woven Fabric | | Heat-Insulation (clo-value) | | Workable Time | |
|---|---|---|---|---|---|---|
| | Warp Density thread per inch | Weft Density thread per inch | Breast portion | Fore-arm Portion | at-30° C. min | Triboelectric Charge micro-coulomb/$m^2$ |
| Example 6 | 55 | 57 | ○ | ○ | 120 | 0.4 |
| Example 7 | 145 | 57 | ◎ | ◎ | 180 | 0.4 |
| Example 8 | 90 | 52 | ◎ | ◎ | 180 | 0.4 |
| Example 9 | 90 | 95 | ◎ | ◎ | 180 | 0.4 |

We claim:

1. Protective goods made from a multiple-layer composite cloth, wherein said composite cloth comprises a surface fabric, an intermediate fibrous-insulator and a lining fabric, mainly composed of aramid fiber, respectively, wherein (1) said surface fabric and said lining fabric comprises meta-aramid fiber by weight of 50 to 100 percent, para-aramid fiber by weight of 0 to 10 percent and other flame-retardant fiber by weight of 0 to 40 percent, with provision that total weight-percent of meta-aramid fiber, para-aramid fiber and other flame-retardant fiber, is 100;

(2) said intermediate fibrous-insulator comprises a multiple-laminated felt made from aramid fiber; and (3) electro-conductive yarns (a) are arranged along lengthwise direction of said surface fabric at a density of 1 to 5 per inch and additional electro-conductive yarns and/or tapes (b) are arranged along the direction intersecting said lengthwise direction to form contact points with said electro-conductive yarns (a), whereby triboelectric charge on the outside surface of said protective goods is less than 0.6 micro-coulomb/$m^2$.

2. Protective goods according to claim 1, wherein said surface fabric further comprises a water-repellent layer on the outside surface thereof.

3. Protective goods according to claim 1, wherein said surface fabric further comprises an inorganic heat-resistant and cold-proof layer of the thickness of 0.1 to 1.0 mm inside and/or on the outside surface thereof.

4. Protective goods according to any one of claims 1 to 3, wherein both of said surface fabric and said lining fabric, are woven fabric, having a warp density more than 50 threads per inch and a weft density more than 50 threads per inch.

5. Protective goods according to any one of claims 1 to 3, wherein the volume-resistivity of said conductive yarns ((a) or (b)) is in the range of $10^8$–$10^{-5}$ Ω·cm.

6. Protective goods according to any one of claims 1 to 3, wherein said other flame-retardant fiber is at least such one selected from the group consisting of polybenzimidazole fiber, poly-p-phenylenebenzbisoxazole fiber, phenolic fiber, melamine fiber and polyimide fiber.

7. Protective goods according to any one of claims 1 to 3, wherein said goods is in the form of an arctic outer-clothing.

8. Protective goods according to any one of claims 1 to 3, wherein said goods is in the form of an arctic inner-clothing.

9. Protective goods according to claim 1, wherein said goods is in the form of outer-clothing and inner clothing, and wherein said outer clothing is integrated with said inner clothing.

10. Protective goods according to claim 9, wherein the lining fabric of said outer-clothing and/or the surface fabric of said inner clothing further comprises a moisture-permeable layer on the surface thereof.

11. Protective goods according to any one of claims 1 to 3, wherein said goods is in the form of a working apron.

12. Protective goods according to any one of claims 1 to 3, wherein said goods is in the form of a working glove.

* * * * *